United States Patent
Huo et al.

(10) Patent No.: US 11,503,312 B2
(45) Date of Patent: Nov. 15, 2022

(54) METHOD AND DEVICES FOR VIDEO PREDICTING A FIRST COLOR COMPONENT FROM A SECOND COMPONENT

(71) Applicant: GUANGDONG OPPO MOBILE TELECOMMUNICATIONS CORP., LTD., Guangdong (CN)

(72) Inventors: Junyan Huo, Guangdong (CN); Xiaoyan Chai, Guangdong (CN); Yanzhuo Ma, Guangdong (CN); Fuzheng Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/170,770

(22) Filed: Feb. 8, 2021

(65) Prior Publication Data
US 2021/0160515 A1  May 27, 2021

Related U.S. Application Data

(63) Continuation of application No. PCT/CN2018/099684, filed on Aug. 9, 2018.

(51) Int. Cl.
*H04N 19/176* (2014.01)
*H04N 19/186* (2014.01)
(Continued)

(52) U.S. Cl.
CPC ......... *H04N 19/186* (2014.11); *H04N 19/105* (2014.11); *H04N 19/176* (2014.11); *H04N 19/593* (2014.11)

(58) Field of Classification Search
None
See application file for complete search history.

(56) References Cited

U.S. PATENT DOCUMENTS 8,861,594 B2  10/2014  Kim
9,426,472 B2   8/2016  Kim et al.
(Continued)

FOREIGN PATENT DOCUMENTS

CN    101385346 A    3/2009
CN    103096055 A    5/2013
(Continued)

OTHER PUBLICATIONS

International Search Report in the international application No. PCT/CN2018/099684, dated May 8, 2019.
(Continued)

*Primary Examiner* — Alison Slater
(74) *Attorney, Agent, or Firm* — Perkins Coie LLP

(57) ABSTRACT

A method and device for predicting colour component and a computer storage medium are provided. The method includes: acquiring at least one threshold value according to first colour component reconstructed values of all samples of a current coding block; performing grouping according to comparison results between a first colour component neighboring reference values of current coding block and the at least one threshold value to obtain at least two groups of first colour component neighboring reference values and second colour component neighboring reference values; establishing at least two computing models; selecting, according to comparison results between the first colour component reconstructed values and at least one threshold value, a computing model corresponding to each sample in current coding block from at least two computing models; and acquiring, according to the computing model corresponding to each sample, second colour component prediction values of all samples in the current coding block.

26 Claims, 10 Drawing Sheets

(51) Int. Cl.
*H04N 19/593* (2014.01)
*H04N 19/105* (2014.01)
*H04N 19/126* (2014.01)

(56) References Cited

U.S. PATENT DOCUMENTS

| | | | |
|---|---|---|---|
| 9,462,273 | B2 | 10/2016 | Zhang et al. |
| 9,900,601 | B2 | 2/2018 | Zhang et al. |
| 9,918,106 | B2 | 3/2018 | Kim et al. |
| 2011/0255591 | A1 | 10/2011 | Kim |
| 2014/0233650 | A1 | 8/2014 | Zhang et al. |
| 2015/0071352 | A1 | 3/2015 | Kim et al. |
| 2016/0330477 | A1 | 11/2016 | Kim et al. |
| 2016/0373765 | A1 | 12/2016 | Zhang et al. |
| 2018/0077426 | A1* | 3/2018 | Zhang ............... H04N 19/117 |
| 2018/0131944 | A1 | 5/2018 | Zhang et al. |
| 2018/0199063 | A1 | 7/2018 | Kim et al. |
| 2018/0316918 | A1* | 11/2018 | Drugeon ............ H04N 19/176 |
| 2020/0177878 | A1* | 6/2020 | Choi ................... H04N 19/159 |
| 2020/0389650 | A1* | 12/2020 | Laroche ............... H04N 19/42 |
| 2020/0413062 | A1* | 12/2020 | Onno .................. H04N 19/105 |

FOREIGN PATENT DOCUMENTS

| | | | |
|---|---|---|---|
| CN | 103379321 | A | 10/2013 |
| CN | 105472386 | A | 4/2016 |
| CN | 107580222 | A | 1/2018 |
| CN | 107580222 | B | 2/2020 |
| RU | 2620723 | C2 | 5/2017 |
| WO | 2013155817 | A1 | 10/2013 |
| WO | 2017129023 | A1 | 8/2017 |
| WO | 2018053293 | A1 | 3/2018 |

OTHER PUBLICATIONS

Zhang (Qualcomm) K et al: "Enhanced Cross-component Linear Model Intra-prediction". 4. JVET Meeting; Oct. 15, 2016-Oct. 21, 2016: Chengdu; (The Joint Video Exploration Team of ISO/IEC JTC1/SC29/WG11 and ITU-T SG.16), No. JVET-D0110 Oct. 6, 2016 (Oct. 6, 2016), pp. 1-5, XP030150354.
Supplementary European Search Report in the European application No. 18929384.8, dated Apr. 1, 2021.
First Office Action of the European application No. 18929384.8, dated Jan. 13, 2022. 5 pages.
First Office Action of the Indian application No. 202127009013, dated Jan. 24, 2022. 6 pages with English translation.
First Office Action of the Russian application No. 2021105304, dated Nov. 30, 2021. 17 pages with English translation.
First Office Action of the Canadian application No. 3109008, dated Feb. 18, 2022. 6 pages.
First Office Action of the Chinese application No. 202110315871.2, dated Jun. 29, 2022. 25 pages with English Translation.
Second Office Action of the European application No. 18929384.8, dated Jul. 13, 2022. 4 pages.

\* cited by examiner

METHOD AND DEVICES FOR VIDEO PREDICTING A FIRST COLOR COMPONENT FROM A SECOND COMPONENT

CROSS-REFERENCE TO RELATED APPLICATION

The present disclosure is a U.S. continuation application of International Application No. PCT/CN2018/099684, filed on Aug. 9, 2018. The content of the International Application No. PCT/CN2018/099684 is incorporated herein by reference in its entirety.

BACKGROUND

With the increase for requirements of people on video display quality, novel video application forms such as high-definition and ultra-high-definition videos have emerged. Under the condition where the high-definition and high-quality video appreciation applications become more and more extensive, increasingly higher requirements are also imposed on video compression technologies. H.265/High Efficiency Video Coding (HEVC) is the latest international video coding standard at present. Compared with the compression performance of a previous-generation video coding standard H.264/Advanced Video Coding (AVC), the compression performance of H.265/HEVC is improved by about 50% but still cannot meet a rapid development requirement of video applications, particularly of novel video applications such as ultra-high-definition and Virtual Reality (VR) videos.

The video coding experts group of the International Telecommunication Union Telecommunication Standardization Sector (ITU-T) and the motion picture experts group of the International Standardization Organization (ISO)/International Electrotechnical Communication (IEC) set up the Joint Video Exploration Team (WET) in 2015 to start formulating a next-generation video coding standard. A Joint Exploration Test Model (JEM) is a universal reference software platform, and verification of different coding tools is implemented based on this platform. The JVET formally named the next-generation video coding standard after Versatile Video Coding (VVC) in April, 2018, and a corresponding test model is a View Transformation Model (VTM). A prediction method based on a linear model has been integrated in the reference software JEM and VTM, and a predicted value for a chroma component may be obtained from a luma component through a linear model.

SUMMARY

Embodiments of the application relate to the technical field of video encoding and decoding, and more particularly to a method and apparatus for predicting a video colour component and a computer storage medium.

In order to solve the above technical problems, the embodiments of the application are expected to provide a method and apparatus for predicting a video colour component and a computer storage medium, such that the prediction accuracy of the video colour component may be improved, and thus the coding rate is saved.

The technical solutions of the embodiments of the application may be implemented as follows.

According to a first aspect, the embodiments of the application provide a method for predicting a video colour component, which may include the following operations.

At least two groups of first colour component neighboring reference values and second colour component neighboring reference values of a current coding block are determined.

At least two computing models are established according to the at least two groups of first colour component neighboring reference values and second colour component neighboring reference values.

A computing model corresponding to the current block is selected from the at least two computing models.

A second colour component predicted value of at least one sample in the current coding block is acquired according to the computing model corresponding to the current coding block.

According to a second aspect, the embodiments of the application provide a method for predicting a video colour component, which may include the following operations.

At least two groups of first colour component neighboring reference values and second colour component neighboring reference values of a current coding block are determined.

At least two computing models are established according to the at least two groups of first colour component neighboring reference values and second colour component neighboring reference values.

A computing model corresponding to the current coding block is selected from the at least two computing models.

A second colour component predicted value of at least one sample in the current coding block is acquired according to the computing model corresponding to the current coding block.

According to a third aspect, the embodiments of the application provide a device for predicting a video colour component, which is applicable to an encoder. The device for predicting the video colour component may include: a network interface, a memory and a processor.

The network interface is configured to receive and send signals in a process of receiving and sending information with other external network elements.

The memory is configured to store computer programs capable of running in the processor.

The processor is configured to run the computer programs to execute the operations of the method in the first aspect.

According to a fourth aspect, the embodiments of the application provide a device for predicting a video colour component, which is applicable to a decoder. The device for predicting the video colour component may include: a network interface, a memory and a processor.

The network interface is configured to receive and send signals in a process of receiving and sending information with other external network elements.

The memory is configured to store computer programs capable of running in the processor.

The processor is configured to run the computer programs to execute the operations of the method in the second aspect.

DETAILED DESCRIPTION

In the prior art, when model parameters of the linear model are computed, only the neighboring reference luma values and the neighboring reference chroma values are considered, which results in that the computed linear model has deviations and the accuracy of the predicted chroma value obtained by the use of the linear model is low.

According to the method and apparatus for predicting the video colour component and the computer storage medium provided by the embodiments of the application, at least one threshold is acquired according to first colour component reconstructed values of all samples of a current coding block; grouping is performed according to comparison results between first colour component neighboring reference values of the current coding block and the at least one threshold to obtain at least two groups of first colour component neighboring reference values and second colour component neighboring reference values; at least two computing models are established according to the at least two groups of first colour component neighboring reference values and second colour component neighboring reference values; a computing model corresponding to each sample in the current coding block is selected from the at least two computing models according to comparison results between the first colour component reconstructed values of all samples of the current coding block and the at least one threshold; and second colour component predicted values of all samples in the current coding block is acquired according to the computing model corresponding to each sample in the current coding block. Therefore, the prediction accuracy of the video colour component may be improved, and thus the coding rate is saved.

In order to understand the characteristics and technical contents of the embodiments of the application in more detail, implementation of the embodiments of the application will be described below in combination with the drawings in detail. The appended drawings are only adopted for description as references and are not intended to limit the embodiments of the application.

Figure 1A:
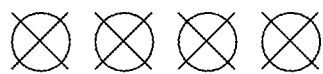
FIG. 1A to FIG. 1C are structural schematic diagrams of video sampling formats in related technical solutions.
Figure 1A:
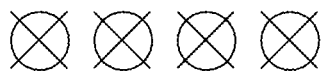
Figure 1A:
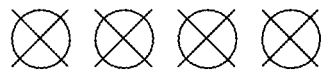
Figure 1A:
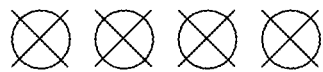
Figure 1B:
Figure 1B:
Figure 1B:
Figure 1B:
Figure 1C:
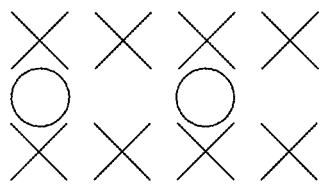
Figure 1C:
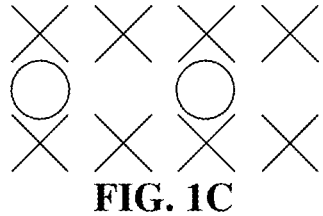

In a video, a first colour component, a second colour component and a third colour component are usually adopted to represent decoding blocks. The three colour components include one luma component and two chroma components. The luma component is usually represented by a sign Y, and the chroma components are usually represented by signs Cb and Cr. The Cb is a blue chroma component and the Cr is a red chroma component. In the embodiments of the application, the first colour component may be the luma component Y, the second colour component may be the blue chroma component Cb, and the third colour component may be the red chroma component Cr. However, no specific limits are made thereto in the embodiments of the application. At present, a common sampling format is a YCbCr format. The YCbCr formats comprises the following formats, as shown in FIG. 1A to FIG. 1C respectively. In the figures, the cross represents a sample of the first colour component, and the circle represents a sample of the second colour component or a sample of the third colour component. The YCbCr format includes the following formats.

A 4:4:4 format: as shown in FIG. 1A, the second colour component or the third colour component is not down-sampled.

A 4:2:2 format: as shown in FIG. 1B, 2:1 horizontal sampling is performed on the second colour component or the third colour component relative to the first colour component, and vertical down-sampling is not performed. For every two samples of the second colour component or samples of the third colour component, each scan line includes four Y samples.

A 4:2:0 format: as shown in FIG. 1C, 2:1 horizontal down-sampling and 2:1 vertical down-sampling are performed on the second colour component or the third colour component relative to the first colour component.

Under the condition that the YCbCr 4:2:0 format is adopted for a video, if a first colour component of the video is a coding block with a size 2N×2N, a corresponding second colour component or third colour component is a coding block with a size N×N, where N is a side length of the coding block. In the embodiments of the application, the following descriptions are made with the 4:2:0 format as an example. However, the technical solutions of the embodiments of the application are also applied to other sample formats.

In a next-generation video coding standard H.266, for further improving the coding performance and coding efficiency, Cross-Component Prediction (CCP) is extended and improved, and Cross-Component Linear Model Prediction (CCLM) is proposed. In H.266, CCLM implements prediction from the first colour component to the second colour component, prediction from the first colour component to the third colour component and prediction between the second colour component and the third colour component. The following descriptions are made with prediction from the first colour component to the second colour component as an example, but the technical solutions of the embodiments of the application may also be applied to prediction for other colour components.

It may be understood that, for reducing a redundancy between the first colour component and the second colour component, in a prediction mode using the CCLM computing model, the second colour component is predicted based on a first colour component reconstructed value of the same coding block. For example, a computing model shown in a formula (1) is adopted:

$$\text{Pred}_C[i,j] = \alpha \cdot \text{Rec}_L[i,j] + \beta \quad (1)$$

Where, i, j represents a position coordinate of the sample in the coding block, i representing a horizontal direction and j representing a vertical direction, $\text{Pred}_C[i, j]$ represents a second colour component predicted value of a sample with the position coordinate [i, j] in the coding block, $\text{Rec}_L[i, j]$ represents a first colour component reconstructed value of the sample with the position coordinate [i, j] in the same coding block (after down-sampling), and both $\alpha$ and $\beta$ are the model parameters of the computing model and may be deducted from minimized regression errors of first colour component neighboring reference values and second colour component neighboring reference values around the current coding block. For example, a formula (2) is used for computing:

$$\begin{cases} \alpha = \dfrac{N \cdot \sum (L(n) \cdot C(n)) - \sum L(n) \cdot \sum C(n)}{N \cdot \sum (L(n) \cdot L(n)) - \sum L(n) \cdot \sum L(n)} \\ \beta = \dfrac{\sum C(n) - \alpha \cdot \sum L(n)}{N} \end{cases} \quad (2)$$

Figure 2A:
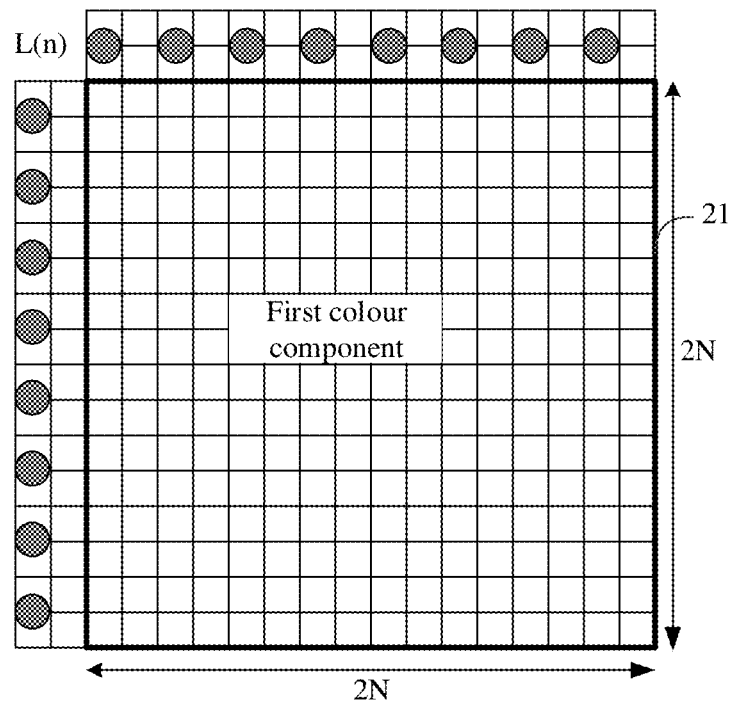
FIG. 2A and FIG. 2B are schematic diagrams for first colour component neighboring reference values and second colour component neighboring reference values of a current coding block in related technical solutions.
Figure 2B:
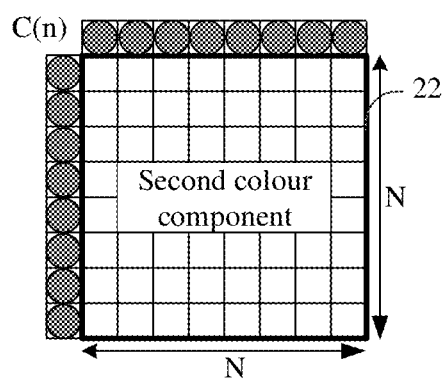

Where, L(n) represents the first colour component neighboring reference values of the left side and the upper side after down-sampling, C(n) represents the second colour component neighboring reference value of the left side and the upper side, and N is the number of second colour component neighboring reference values. Referring to FIG. 2A and FIG. 2B, schematic diagrams for sampling first colour component neighboring reference values and second colour component neighboring reference values of a current coding block in related technical solutions are shown, in which the large bold block is used to highlight a first colour component coding block 21 and a corresponding second colour component coding block 22, and the gray solid circle is used to indicate an neighboring reference value L(n) of the first colour component decoding block 21, or an neighboring reference value C(n) of the second colour component coding block 22. FIG. 2A shows the first colour component coding block 21 with a size 2N×2N. For a video in a 4:2:0 format, a size of a second colour component corresponding to a first colour component with the size 2N×2N is N×N, as shown by 22 in FIG. 2B. Herein, with regard to the square coding block, the formula (2) may be directly applied. With regard to the non-square coding block, the neighboring sampling of the long edge is first subjected to down-sampling to obtain the sampling number equal to that of the short edge, and then the formula (2) is applied. No specific limits are made thereto in the embodiments of the application.

Figure 3A:
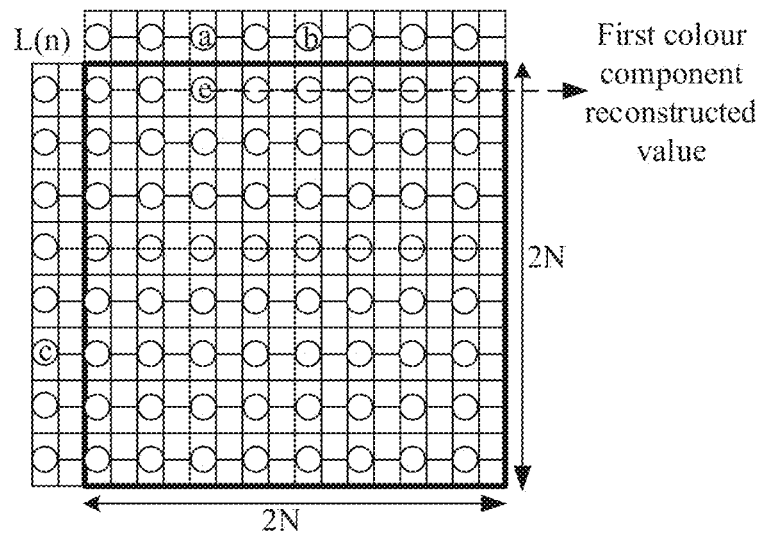
FIG. 3A to FIG. 3C are principle structural schematic diagrams of a CCLM computing model in related technical solutions.
Figure 3B:
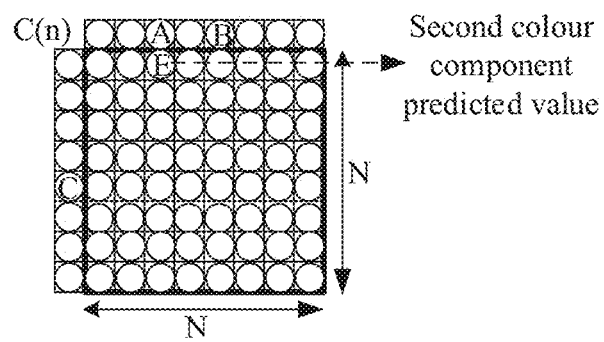
Figure 3C:
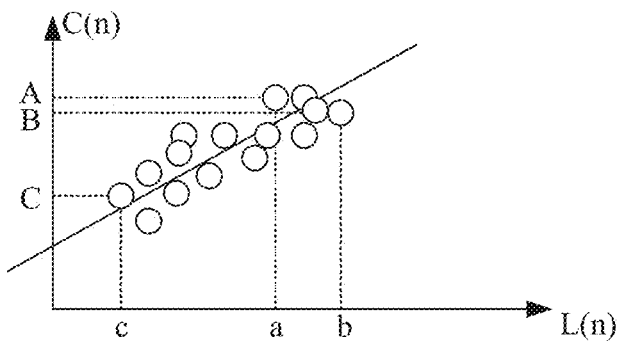

FIG. 3A to FIG. 3C show principle structural schematic diagrams of a CCLM computing model in related technical solutions. As shown in FIG. 3A to FIG. 3C, a, b and c are the first colour component neighboring reference values, A, B and C are the second colour component neighboring reference values, e is the first colour component reconstructed value of a certain sample of the current coding block, and E is the second colour component predicted value of the sample of the current coding block. With the utilization of all first colour component reconstructed values L(n) and second colour component reconstructed values C(n) of the current coding block, $\alpha$ and $\beta$ may be computed according to the formula (2). The computing model may be established according to the computed $\alpha$ and $\beta$ as well as the formula (1), as shown in FIG. 3C. The first colour component reconstructed value e of a certain sample of the current coding block may be substituted into the formula (1) to compute the second colour component predicted value E of the sample of the current coding block.

There are two CCLM prediction modes at present in JEM, one being a single model CCLM prediction mode, and the other being a Multiple Model CCLM (MMLM) prediction mode, which also called the MMLM prediction mode. Just as its name implies, the single model CCLM prediction mode is to predict the second colour component from the first colour component only with one computing model, and the MMLM prediction mode is to predict the second colour component from the first colour component with multiple computing models. For example, in the MMLM prediction mode, the first colour component neighboring reference values and the second colour component neighboring reference values of the current coding block are divided into two groups. Each group may independently serve as a training set to deduce model parameters in the computing model. That is, each group can deduce a group of model parameters $\alpha$ and $\beta$.

In the existing MMLM prediction mode, the mean of the first colour component neighboring reference values is used as a classification basis for the first colour component neighboring reference values, the second colour component neighboring reference values and the first colour component reconstructed values at present. However, in the embodiments of the application, with a view to that the second colour component predicted values of the current coding block are predicted through the first colour component predicted values of the current coding block, in order to improve the prediction accuracy of the video colour component, embodiments of the application is described in detail in combination with the accompanying drawings.

Embodiment 1

Figure 4:
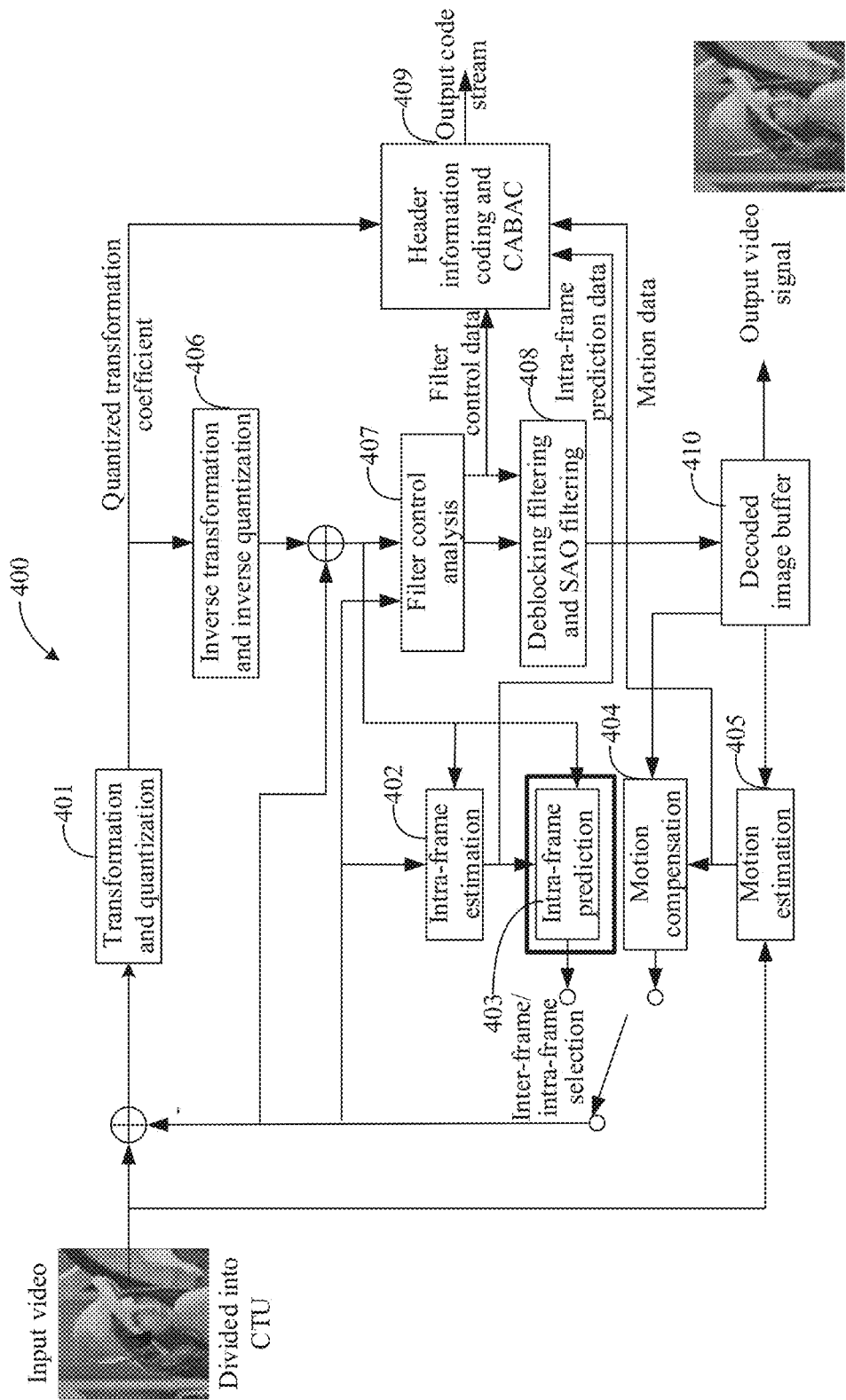
FIG. 4 is a compositional block diagram of a video coding system provided by embodiments of the application.
Figure 5:
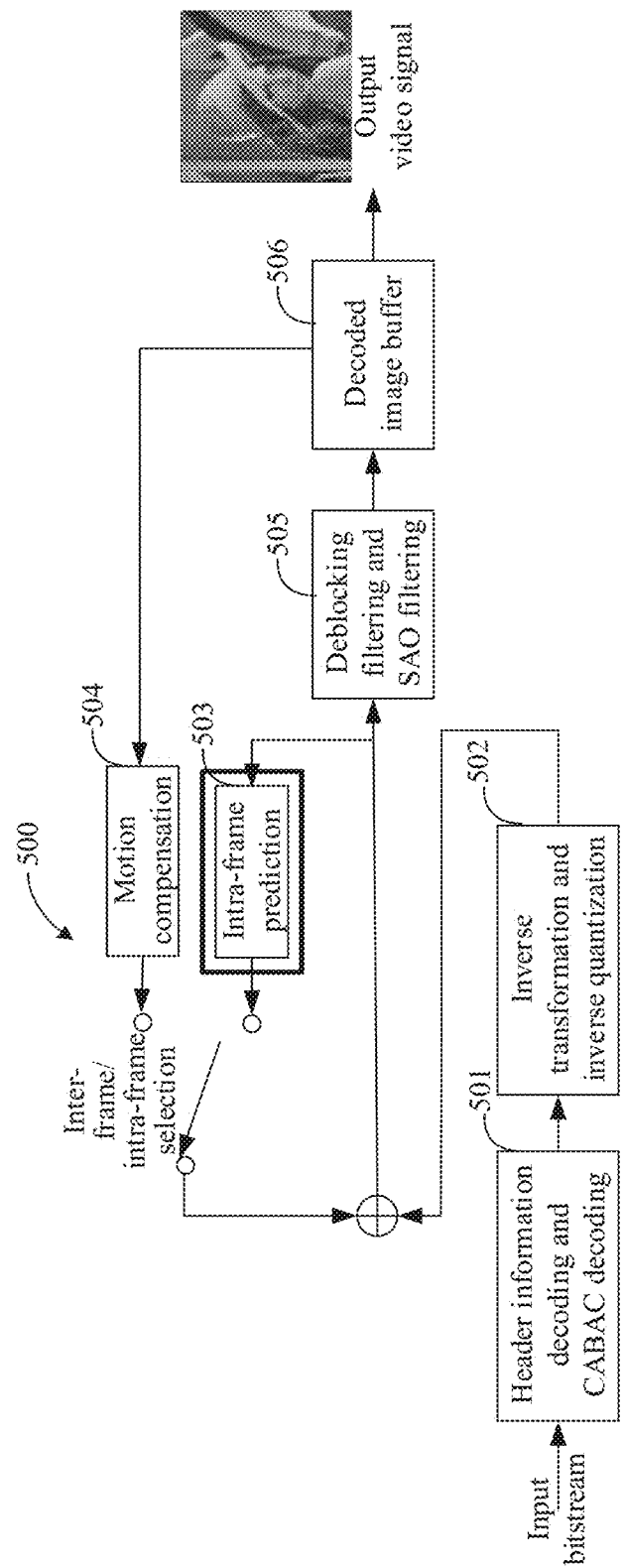
FIG. 5 is a compositional block diagram of a video decoding system provided by embodiments of the application.

Referring to FIG. 4, a compositional block diagram example of a video coding system is shown. Referring to FIG. 5, a compositional block diagram example of a video decoding system is shown. As shown in FIG. 4, the video coding system 400 includes components such as transformation and quantization 401, intra-frame estimation 402, intra-frame prediction 403, motion compensation 404, motion estimation 405, inverse transformation and inverse quantization 406, filter control analysis 407, deblocking filtering and Sample Adaptive Offset (SAO) filtering 408, header information coding and Context-based Adaptive Binary Arithmetic Coding (CABAC) 409 and decoded picture buffer 410. As shown in FIG. 5, the video decoding system 500 includes components such as header information decoding and CABAC decoding 501, inverse transformation and inverse quantization 502, intra-frame prediction 503, motion compensation 504, deblocking filtering and SAO filtering 505 and decoded picture buffer 506. After the video is processed by the components such as the transformation and quantization 401, the intra-frame estimation 402, the intra-frame prediction 403, the motion compensation 404, the motion estimation 405, the deblocking filtering and SAO filtering 408 and the header information decoding and CABAC decoding 409 in the video coding system 400, a bitstream of the video is output. The bitstream is input to the video decoding system 500 and processed by the components such as the header information decoding and CABAC decoding 501, the inverse transformation and inverse quantization 502, the intra-frame prediction 503 and the motion compensation 504 in the video decoding system 500 to restore the original video finally. The embodiments of the application are mainly applied to the part of intra-frame prediction 403 shown in FIG. 4 and the part of intra-frame prediction 503 shown in FIG. 5. That is, the embodiments of the application may be available to both the coding system and the decoding system at the same time. However, no specific limits are made thereto in the embodiments of the application.

Figure 6:
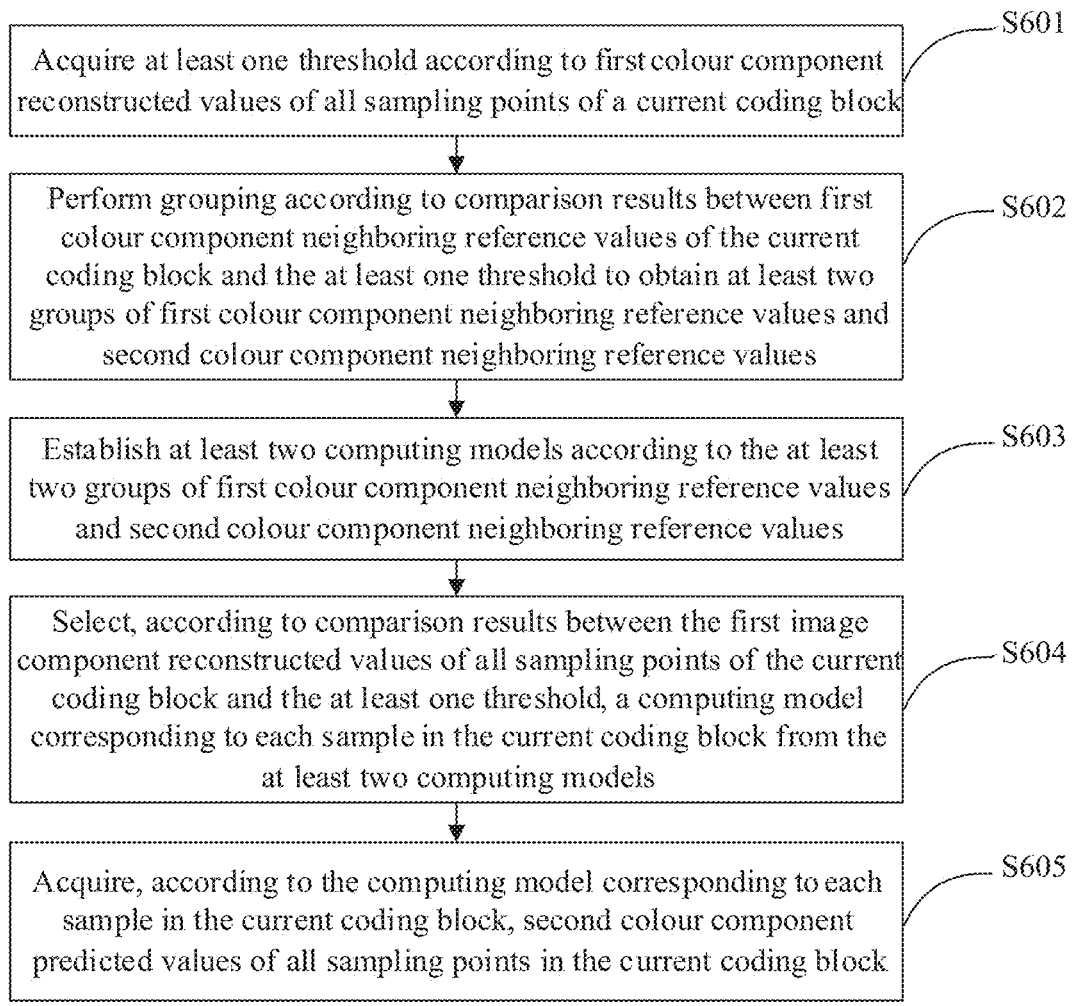
FIG. 6 is a flowchart of a method for predicting a video colour component provided by embodiments of the application.

Based on the above application scenario examples in FIG. 4 or FIG. 5, referring to FIG. 6, a flowchart of a method for predicting a video colour component provided by embodiments of the application is shown. The method may include the following operations.

In S601: at least one threshold is acquired according to first colour component reconstructed values of all samples of a current coding block.

In S602: grouping is performed according to comparison results between first colour component neighboring reference values of the current coding block and the at least one threshold to obtain at least two groups of first colour component neighboring reference values and second colour component neighboring reference values.

In S603: at least two computing models are established according to the at least two groups of first colour component neighboring reference values and second colour component neighboring reference values.

In S604: a computing model corresponding to each sample in the current coding block is selected from the at least two computing models according to comparison results between the first colour component reconstructed values of all samples of the current coding block and the at least one threshold.

In S605: second colour component predicted values of all samples in the current coding block are acquired according to the computing model corresponding to each sample in the current coding block.

Based on the technical solutions shown in FIG. 6, at least one threshold is acquired according to first colour component reconstructed values of all samples of a current coding block. Grouping is performed according to comparison results between first colour component neighboring reference values of the current coding block and the at least one threshold to obtain at least two groups of first colour component neighboring reference values and second colour component neighboring reference values. At least two computing models are established according to the at least two groups of first colour component neighboring reference values and second colour component neighboring reference values. A computing model corresponding to each sample in the current coding block is selected from the at least two computing models according to comparison results between the first colour component reconstructed values of all samples of the current coding block and the at least one threshold. Second colour component predicted values of all samples in the current coding block are acquired according to the computing model corresponding to each sample in the current coding block. Therefore, the prediction accuracy of the video colour component may be improved, and thus the coding rate is saved.

Based on the technical solutions shown in FIG. 6, in a possible implementation manner, before the at least one threshold is acquired according to the first colour component reconstructed values of all samples of the current coding block, the method may further include the following operations.

Neighboring reference values of a first colour component are sampled for the current coding block to acquire the first colour component neighboring reference values of the current coding block.

Neighboring reference values of a second colour component are sampled for the current coding block to acquire the second colour component neighboring reference values of the current coding block.

First colour components are reconstructed and sampled for all samples of the current coding block to acquire the first colour component reconstructed values of all samples of the current coding block.

Hereinafter, the descriptions are made to the schematic diagrams of samples shown in FIG. 2A and FIG. 2B. With regard to the video of the 4:2:0 format, the size of the first colour component coding block is 2N×2N, the size of the corresponding second colour component coding block is N×N, the first colour component neighboring reference values of the current coding block that are obtained by down-sampling are represented by L(n), and the second colour component neighboring reference values of the current coding block that are obtained by sampling are represented by C(n), n=1, 2, 3, . . . , N, N being the number of second colour component neighboring reference values; and the first colour component reconstructed value of each sample of the current coding block that is obtained by sampling is represented by $Rec_L[i, j]$, i and j representing position coordinates of samples in the current coding block, the i representing a horizontal direction, and j representing a vertical direction.

It is to be noted that the threshold is the classification basis for the first colour component neighboring reference values and the second colour component neighboring reference values of the current coding block, and is also the classification basis for the first colour component reconstructed values of the current coding block. The threshold is a set value upon which multiple computing models are established. The magnitude of the threshold is relevant to the first colour component reconstructed values of all samples of the current coding block. Specifically, the threshold may be obtained by computing a mean of the first colour component reconstructed values of all samples of the current coding block, and may also be obtained by computing a mid-value of the first colour component reconstructed values of all samples of the current coding block, and no specific limits are made in the embodiments of the application.

In the embodiments of the application, first of all, the mean Mean may be computed according to the first colour component reconstructed values of all samples of the current coding block and a formula (3):

$$\text{Mean} = \frac{\sum Rec_L[i, j]}{M} \qquad (3)$$

Where, the Mean represents a mean of reconstructed luma values of all samples of the current coding block, $\Sigma Rec_L[i, j]$ represents a sum of the reconstructed luma values of all samples of the current coding block, and the M represents the sampling number of reconstructed luma values of all samples of the current coding block.

Next, the computed mean Mean is directly used as the threshold. Two computing models may be established by the use of the threshold. However, the embodiments of the application are not limited to the establishment of only two computing models. For example, an average is obtained according to a sum $\Sigma \text{Rec}_L[i, j]$ for the first colour component reconstructed values of all samples of the current coding block to obtain the mean Mean. If two computing models are established, the Mean may be directly used as the threshold. The first colour component neighboring reference values of the current coding block may be divided into two parts according to the threshold, which indicates that two computing models may be established subsequently. If three computing models are established, (first colour component minimum reconstructed value+Mean+1)>>1 is used as a first threshold, and (first colour component maximum reconstructed value+Mean+1)>>1 is used as a second threshold. The neighboring reference values of the current coding block may be divided into three parts according to the two threshold values, which indicates that three computing models may be established subsequently. Hereinafter, the descriptions are made with the case where the computed mean Mean is used as the threshold to establish two computing models as an example.

Based on the technical solutions shown in FIG. 6, in a possible implementation manner, the operation that the grouping is performed according to the comparison results between the first colour component neighboring reference values of the current coding block and the at least one threshold to obtain the at least two groups of first colour component neighboring reference values and second colour component neighboring reference values may include the following operations.

If the first colour component neighboring reference values of the current coding block are not greater than the at least one threshold, a first group of first colour component neighboring reference values L(m) and second colour component neighboring reference values C(m) are obtained.

If the first colour component neighboring reference values of the current coding block are greater than the at least one threshold, a second group of first colour component neighboring reference values L(k) and second colour component neighboring reference values C(k) are obtained.

Figure 7:
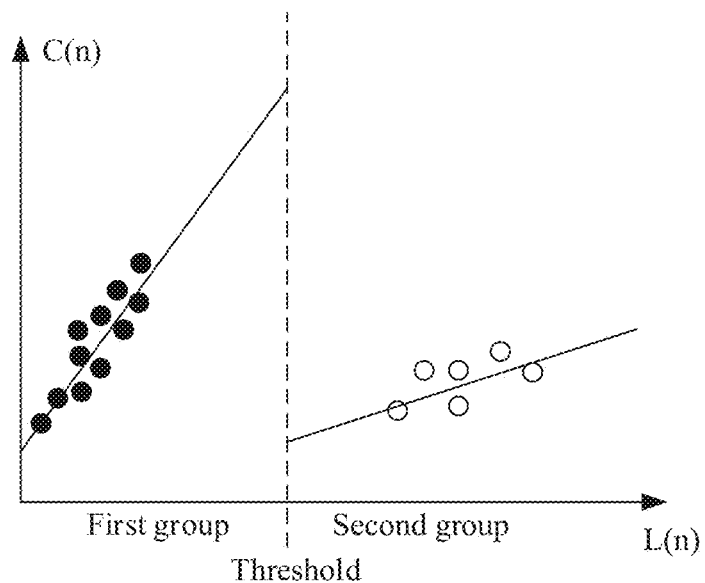
FIG. 7 is a schematic diagram for grouping first colour component neighboring reference values and second colour component neighboring reference values of a current coding block provided by embodiments of the application.

It is to be noted that, with the computed mean Mean as the threshold, the first colour component neighboring reference values of the current coding block may be divided into two parts that are L(m) and L(k) respectively. Correspondingly, the second colour component neighboring reference values of the current coding block may also be divided into two parts that are C(m) and C(k) respectively. For example, referring to FIG. 7, a schematic diagram for grouping first colour component neighboring reference values and second component neighboring reference values of a current coding block provided by embodiments of the application is shown. The first colour component neighboring reference values of the current coding block are represented by L(n), and the second colour component neighboring reference values of the current coding block are represented by C(n). Supposing that the threshold is represented by Threshold, the mean Mean for the first colour component reconstructed values of all samples of the current coding block is used as the threshold in the example, that is, Threshold=Mean. If L(n) ≤Threshold, first colour component neighboring reference values and second colour component neighboring reference values of samples corresponding to L(n) may be determined as the first group, thereby obtaining the first group of first colour component neighboring reference values L(m) and second colour component neighboring reference values C(m). If L(n)>Threshold, first colour component neighboring reference values and second colour component neighboring reference values of samples corresponding to L(n) may be determined as the second group, thereby obtaining the second group of first colour component neighboring reference values L(k) and second colour component neighboring reference values C(k).

It may be understood that after the first group of first colour component neighboring reference values L(m) and second colour component neighboring reference values C(m) as well as the second group of first colour component neighboring reference values L(k) and second colour component neighboring reference values C(k) are obtained, each group of first colour component neighboring reference values and second colour component neighboring reference values may be used as an independent training set. That is, each group can train a group of model parameters. Therefore, in the above implementation manner, specifically, the operation that the at least two computing models are established according to the at least two groups of first colour component neighboring reference values and second colour component neighboring reference values may include the following operations.

A first parameter α1 of a first computing model and a second parameter β1 of the first computing model are computed according to L(m), C(m) and a formula (4):

$$\begin{cases} \alpha 1 = \dfrac{M \cdot \sum (L(m) \cdot C(m)) - \sum L(m) \cdot \sum C(m)}{M \cdot \sum (L(m) \cdot L(m)) - \sum L(m) \cdot \sum L(m)} \\ \beta 1 = \dfrac{\sum C(m) - \alpha 1 \cdot \sum L(m)}{M} \end{cases} \quad (4)$$

A first parameter α2 of a second computing model and a second parameter β2 of the second computing model are computed according to L(k), C(k) and a formula (5):

$$\begin{cases} \alpha 2 = \dfrac{K \cdot \sum (L(k) \cdot C(k)) - \sum L(k) \cdot \sum C(k)}{K \cdot \sum (L(k) \cdot L(k)) - \sum L(k) \cdot \sum L(k)} \\ \beta 2 = \dfrac{\sum C(k) - \alpha 2 \cdot \sum L(k)}{K} \end{cases} \quad (5)$$

The first computing model $\text{Pred}_{1C}[i, j]$ and the second computing model $\text{Pred}_{2C}[i, j]$ are established according to the first parameter α1 of the first computing model and the second parameter β1 of the first computing model, the first parameter α2 of the second computing model and the second parameter β2 of the second computing model as well as a formula (6):

$$\begin{cases} \text{Pred}_{1C}[i, j] = \alpha 1 \times \text{Rec}_L[i, j] + \beta 1, \text{ if } \text{Rec}_L[i, j] \leq \text{Threshold} \\ \text{Pred}_{2C}[i, j] = \alpha 2 \times \text{Rec}_L[i, j] + \beta 2, \text{ if } \text{Rec}_L[i, j] > \text{Threshold} \end{cases} \quad (6)$$

Where, M represents the number of first colour component neighboring reference values L(m) or second colour component neighboring reference values in the first group C(m), K represents the number of first colour component neighboring reference values L(k) or second colour component neighboring reference values in the second group C(k) and i and j represent position coordinates of samples in the current coding block, i representing a horizontal direction and the j representing a vertical direction; the Threshold represents a preset threshold which is obtained according to the first colour component reconstructed values of all samples of the current coding block; $Rec_L[i, j]$ represents a first colour component reconstructed value of a sample with a position coordinate [i, j] in the current coding block; and $Pred_{1C}[i, j]$ and $Pred_{2C}[i, j]$ represent second colour component predicted values of the sample with the position coordinate [i, j] in the current coding block.

It may be understood that, in light of a similarity between the first colour component reconstructed value and the first colour component neighboring reference value of the current coding block, each neighboring reference sample is allocated with a weight (that is, a weighting coefficient) according to the magnitude of the similarity to correct the first parameter α and the second parameter β of the computing model, such that the deduced computing model may be more accurate. With a difference between the first colour component neighboring reference value and the first colour component reconstructed value as an example for description in the embodiments of the application, the weighting coefficient has the following design criteria: a difference set between the first colour component neighboring reference value and first colour component reconstructed values of all samples of the current coding block is computed, and a minimum value is acquired from the difference set. The designed weighting coefficient is inversely proportional to the minimum value. A smaller difference indicates that the similarity between the first colour component neighboring reference value and the first colour component reconstructed value of the current coding block is greater. That is, the weighting coefficient is also greater. Otherwise, the weighting coefficient is smaller. In addition, the weighting coefficient not only may be computed according to the difference between the first colour component neighboring reference value and the first colour component reconstructed value of the current coding block, but also may be computed according to the number of times that the first colour component neighboring reference value of the current coding block occurs in the current coding block, and even may further be computed according to other manners of the first colour component of the current coding block; and no specific limits are made thereto in the embodiments of the application. Hereinafter, the weighting coefficient is described with the difference between the first colour component neighboring reference value and the first colour component reconstructed value of the current coding block as an example.

Based on the technical solutions shown in FIG. 6, in a possible implementation manner, before the at least two computing models are established according to the at least two groups of first colour component neighboring reference values and second colour component neighboring reference values, the method may further include the following operations.

A weighting coefficient w(m) for L(m) and C(m) of the first computing model is computed according to L(m), $Rec_L[i, j]$ and a formula (7):

$$w(m) = e^{-\frac{(min(L(m)-Rec_L[i,j]))^2}{2\cdot\sigma^2}} \quad (7)$$

A weighting coefficient w(k) for L(k) and C(k) of the second computing model is computed according to L(k), $Rec_L[i, j]$ and a formula (8):

$$w(k) = e^{-\frac{(min(L(m)-Rec_L[i,j]))^2}{2\cdot\sigma^2}} \quad (8)$$

In the above implementation manner, specifically, the operation that the at least two computing models are established according to the at least two groups of first colour component neighboring reference values and second colour component neighboring reference values may include the following operations.

A first parameter α1 of a first computing model and a second parameter β1 of the first computing model are computed according to w(m), L(m), C(m) and a formula (9):

$$\begin{cases} \alpha 1 = \dfrac{\sum w(m)\cdot\sum(w(m)\cdot L(m)\cdot C(m)) - \sum(w(m)\cdot L(m))\cdot\sum(w(m)\cdot C(m))}{\sum w(m)\cdot\sum(w(m)\cdot L(m)\cdot L(m)) - \sum(w(m)\cdot L(m))\cdot\sum(w(m)\cdot L(m))} \\ \beta 1 = \dfrac{\sum(w(m)\cdot C(m)) - \alpha 1\cdot\sum(w(m)\cdot L(m))}{\sum w(m)} \end{cases} \quad (9)$$

A first parameter α2 of a second computing model and a second parameter β2 of the second computing model are computed according to w(k), L(k), C(k) and a formula (10):

$$\begin{cases} \alpha 2 = \dfrac{\sum w(k)\cdot\sum(w(k)\cdot L(k)\cdot C(k)) - \sum(w(k)\cdot L(k))\cdot\sum(w(k)\cdot C(k))}{\sum w(k)\cdot\sum(w(k)\cdot L(k)\cdot L(k)) - \sum(w(k)\cdot L(k))\cdot\sum(w(k)\cdot L(k))} \\ \beta 2 = \dfrac{\sum(w(k)\cdot C(k)) - \alpha 2\cdot\sum(w(k)\cdot L(k))}{\sum w(k)} \end{cases} \quad (10)$$

The first computing model $Pred_{1C}[i, j]$ and the second computing model $Pred_{2C}[i, j]$ are established according to the first parameter α1 of the first computing model and the second parameter β1 of the first computing model, the first parameter α2 of the second computing model and the second parameter β2 of the second computing model as well as a formula (11):

$$\begin{cases} Pred_{1C}[i, j] = \alpha 1 \times Rec_L[i, j] + \beta 1, \text{ if } Rec_L[i, j] \leq \text{Threshold} \\ Pred_{2C}[i, j] = \alpha 2 \times Rec_L[i, j] + \beta 2, \text{ if } Rec_L[i, j] > \text{Threshold} \end{cases} \quad (11)$$

Where, i and j represent position coordinates of samples in the current coding block, i representing a horizontal direction and j representing a vertical direction; the Threshold represents a preset threshold which is obtained according to the first colour component reconstructed values of all samples of the current coding block; the $Rec_L[i, j]$ represents a first colour component reconstructed value of a sample with a position coordinate [i, j] in the current coding block; and the $Pred_{1C}[i, j]$ and the $Pred_{2C}[i, j]$ represent second colour component predicted values of the sample with the position coordinate [i, j] in the present coding block.

Figure 8:
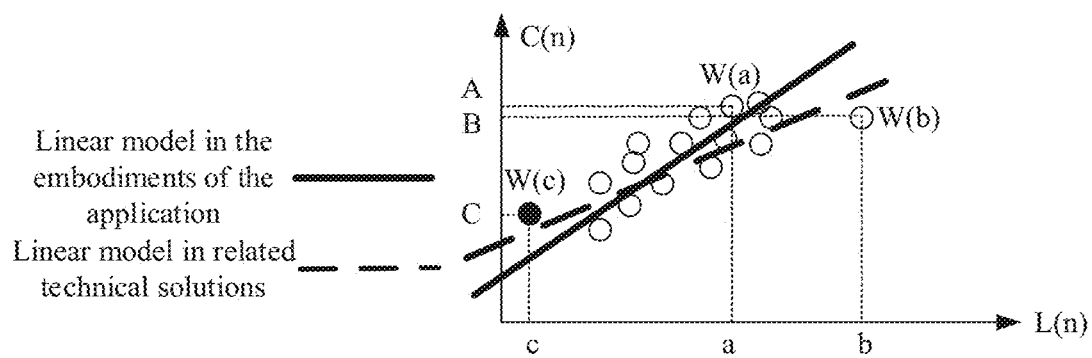
FIG. 8 is a schematic diagram of a comparison between a computing model in related technical solutions and a computing model provided by embodiments of the application.

It is to be noted that, in the embodiments of the application, in light of the similarity between the first colour component reconstructed value and the first colour component neighboring reference value of the current coding block, for example, the weighting coefficient is computed with the difference between the first colour component neighboring reference value and the first colour component reconstructed value of the current coding block; and then, each neighboring reference sample is weighted according to the weighting coefficient. By correcting the α1 and the β1 as well as the α2 and the β2, the deduced computing model may be more accurate, and thus, the second colour component predicted value of the current coding block is closer to the second colour component real value of the current coding block. Referring to FIG. 8, a schematic diagram of a comparison between a computing model in related technical solutions and a computing model provided by embodiments of the application is shown. In FIG. 8, if a first colour component neighboring reference value much deviated from the first colour component reconstructed value of the current coding block is used to construct the computing model, it is possible that the second colour component predicted value of the current coding block is far deviated from the second colour component real value and thus the prediction accuracy is reduced. With b and c in FIG. 8 for example, as the first colour component neighboring reference value at each of b and c is relatively deviated from the first colour component reconstructed value of the current coding block, when the computing model is deduced according to the related technical solutions, the two points are also used to compute model parameters α and β and thus the deduced computing model is far deviated from the expected computing model. However, in the embodiments of the application, each neighboring reference sample, for example, w(a), w(b) and w(c), is weighted through the weighting coefficient w(m), such that the deduced computing model is more suitable for the expected computing model and thus the second colour component predicted value of the current coding block is closer to the second colour component real value of the current coding block.

Based on the technical solutions shown in FIG. 6, in a possible implementation manner, the operation that a computing model corresponding to each sample in the current coding block is selected from the at least two computing models according to the comparison results between the first colour component reconstructed values of all samples of the current coding block and the at least one threshold may include the following operations.

Grouping is performed according to the comparison results between the first colour component reconstructed values of all samples of the current coding block and the at least one threshold to obtain at least two groups of first colour component reconstructed value sets, and a corresponding relationship between the at least two groups of first colour component reconstructed value sets and the at least two computing models.

A computing model corresponding to each sample in the current coding block is selected from the at least two computing models according to first colour component reconstructed value sets to which the first colour component reconstructed values of all samples in the current coding block belongs and the corresponding relationship between the at least two groups of first colour component reconstructed value sets and the at least two computing models.

It is to be noted that after the two computing models corresponding to the formula (6) or formula (11) are obtained, the first colour component reconstructed values $Rec_L[i, j]$ of all samples of the current coding block are first compared with the threshold Threshold. At least two groups of first colour component reconstructed value sets as well as a corresponding relationship between the at least two groups of first colour component reconstructed value sets and the at least two computing models may be obtained according to comparison results. Next, a first colour component reconstructed value set to which $Rec_L[i, j]$ belongs is determined through the first colour component reconstructed value $Rec_L[i, j]$ of the sample with the position coordinate [i, j]. That is, whether $Rec_L[i, j]$ Threshold or $Rec_L[i, j]$>Threshold is first determined, and the first colour component reconstructed value set to which $Rec_L[i, j]$ belongs is determined. Then, whether the second colour component predicted value of the sample with the position coordinate [i, j] is computed with the first computing model, or computed with the second computing model is determined. That is, if $Rec_L[i, j]$ Threshold, $Rec_L[i, j]$ is substituted into the first computing model to compute the second colour component predicted value of the sample with the position coordinate [i, j]; and if $Rec_L[i, j]$>Threshold, $Rec_L[i, j]$ is substituted into the second computing model to compute the second colour component predicted value of the sample with the position coordinate [i, j].

It may be understood that, in light of the similarity between the first colour component reconstructed value and the first colour component neighboring reference value of the current coding block, before the computing model is established, the first colour component neighboring reference value of the current coding block may further be screened. It is to be noted that the screening criteria may be screened according to the difference between the first colour component neighboring reference value and the first colour component reconstructed value of the current coding block, may further be screened according to the number of times that the first colour component neighboring reference value of the current coding block occurs in the current coding block, and even may further be screened according to other manners of the first colour component of the current coding block; and no specific limits are made thereto in the embodiments of the application. Hereinafter, the screening is described with the difference between the first colour component neighboring reference value and the first colour component reconstructed value of the current coding block as an example.

Based on the technical solutions shown in FIG. 6, in a possible implementation manner, before the at least two computing models are established according to the at least two groups of first colour component neighboring reference values and second colour component neighboring reference values, the method may further include the following operations.

The first colour component neighboring reference values of the current coding block are traversed, and difference computation is performed on any one sampling value in the first colour component neighboring reference values and the first colour component reconstructed values corresponding to all samples of the current coding block to obtain a difference set corresponding to the sampling value.

If a minimum value in the difference set is greater than a preset threshold, the sampling value is removed from the first colour component neighboring reference values and a sampling value of a corresponding position is removed from the second colour component neighboring reference values.

It is to be noted that before the computing model is obtained, the similarity between the first colour component reconstructed value and the first colour component neighboring reference value of the current coding block may further be considered. That is, the first colour component neighboring reference value is screened according to the difference between the first colour component neighboring reference value and the first colour component reconstructed value. For example, a preset threshold is first set. Then, all first colour component neighboring reference values of the current coding block are traversed, and a difference between any one sampling value in the first colour component neighboring reference values and each first colour component reconstructed value of all samples of the current coding block is obtained. If a minimum value among differences between a certain sampling value in the first colour component neighboring reference values and current all first colour component reconstructed values is greater than the preset threshold, it is considered that the neighboring point of the corresponding position of the sampling value is an interference point, which may affect the accuracy of the computing model. The neighboring point needs to be removed from the training samples of the computing model. Subsequently, the first colour component neighboring reference values after the interference point is removed and the corresponding second colour component neighboring reference values are used as the training samples of the computing model to obtain the model parameters, and thus the deduced computing model is more accurate.

In the above MMLM prediction mode, in addition to the prediction from the first colour component of the current coding block to the second colour component, the prediction from the second colour component to the third colour component or from the third colour component to the second colour component may further be performed. The method for the prediction from the third colour component to the second colour component is similar to the method for the prediction from the second colour component to the third colour component. In the embodiments of the application, the prediction from the second colour component to the third colour component is used as an example for descriptions.

Based on the technical solutions shown in FIG. 6, in a possible implementation manner, the method may further include the following operations.

A predicted residual pred'$_{Cb}$[i, j] of a second colour component of a sample [i, j] in the current coding block and a third colour component estimated value pred$_{Cr}$[i, j] of the sample[i, j] are acquired.

A third colour component predicted value of the sample[i, j] is computed according to pred'$_{Cb}$[i, j], pred$_{Cr}$[i, j] and a formula (12):

$$\begin{cases} \alpha^* = \dfrac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \\ Pred^*_{Cr}[i, j] = pred_{Cr}[i, j] + \alpha \cdot resi'_{Cb}[i, j] \end{cases} \quad (12)$$

Where, pred*$_{Cr}$[i, j] represents a third colour component predicted value of a sample with a position coordinate [i, j] in the current coding block, a* represents a scaling factor, Cb(n) represents a second colour component neighboring reference value of the current coding block, Cr(n) represents a third colour component neighboring reference value of the current coding block, and the $\lambda$ is equal to $\Sigma(Cb(n) \cdot Cb(n)) \gg 9$.

It is to be noted that in the MMLM prediction mode, the prediction from the second colour component to the third colour component is applied to a residual domain, and the original reconstruction sampling signal is replaced. The value of the $\lambda$ may be used to determine what extent (−0.5) affects the deduced value of a*. For example, when a larger value of $\lambda$ is used, (−0.5) will have a great impact. In the embodiments of the application, the value of $\lambda$ may be equal to $\Sigma(Cb(n) \cdot Cb(n)) \gg z$, z being a predefined fixed value (such as 7, 8 or 9); and the value of $\lambda$ may also change based on feature contents of the current coding block (such as the size of the coding block, the reference samples and the like) and no specific limits are made thereto in the embodiments of the application.

According to the method for predicting the video colour component provided by the embodiments, at least one threshold is acquired according to first colour component reconstructed values of all samples of a current coding block; grouping is performed according to comparison results between first colour component neighboring reference values of the current coding block and the at least one threshold to obtain at least two groups of first colour component neighboring reference values and second colour component neighboring reference values; at least two computing models are established according to the at least two groups of first colour component neighboring reference values and second colour component neighboring reference values; a computing model corresponding to each sample in the current coding block is selected from the at least two computing models according to comparison results between the first colour component reconstructed values of all samples of the current coding block and the at least one threshold; and second colour component predicted values of all samples in the current coding block is acquired according to the computing model corresponding to each sample in the current coding block. Therefore, the prediction accuracy of the video colour component may be improved, and thus the coding rate is saved.

Embodiment 2

Figure 9:
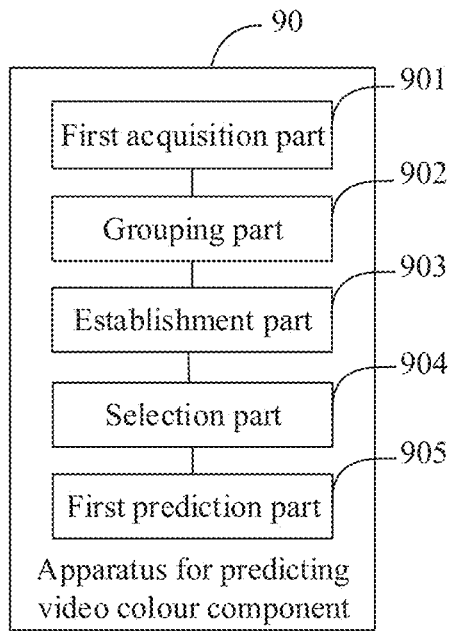
FIG. 9 is a compositional structural schematic diagram of an apparatus for predicting a video colour component provided by embodiments of the application.

Based on the same inventive concept as the foregoing embodiments, referring to FIG. 9, a composition of an apparatus 90 for predicting a video colour component provided by embodiments of the application is shown. The apparatus 90 for predicting the video colour component may include: a first acquisition part 901, a grouping part 902, an establishment part 903, a selection part 904 and a first prediction part 905.

The first acquisition part 901 is configured to acquire at least one threshold according to first colour component reconstructed values of all samples of a current coding block.

The grouping part 902 is configured to perform grouping according to comparison results between first colour component neighboring reference values of the current coding block and the at least one threshold to obtain at least two groups of first colour component neighboring reference values and second colour component neighboring reference values.

The establishment part 903 is configured to establish at least two computing models according to the at least two groups of first colour component neighboring reference values and second colour component neighboring reference values.

The selection part 904 is configured to select a computing model corresponding to each sample in the current coding block from the at least two computing models according to comparison results between the first colour component reconstructed values of all samples of the current coding block and the at least one threshold.

The first prediction part 905 is configured to acquire second colour component predicted values of all samples in the current coding block according to the computing model corresponding to each sample in the current coding block.

Figure 10:
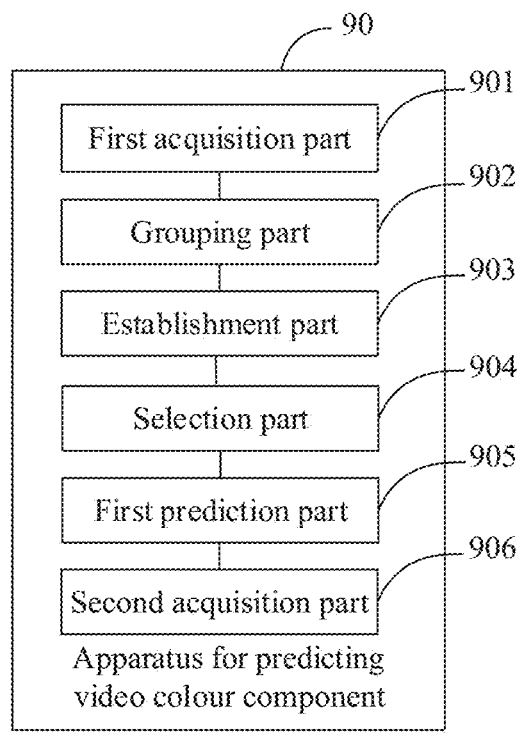
FIG. 10 is a compositional structural schematic diagram of another apparatus for predicting a video colour component provided by embodiments of the application.

In the above solutions, referring to FIG. 10, the apparatus 90 for predicting the video colour component may further include a second acquisition part 906, which is configured to perform the following operations.

Neighboring reference values of a first colour component are sampled for the current coding block to acquire the first colour component neighboring reference values of the current coding block.

Neighboring reference values of a second colour component are sampled for the current coding block to acquire the second colour component neighboring reference values of the current coding block.

First colour components are reconstructed and sampled for all samples of the current coding block to acquire the first colour component reconstructed values of all samples of the current coding block.

In the above solutions, the grouping part 902 is specifically configured to perform the following operations.

If the first colour component neighboring reference values of the current coding block are not greater than the at least one threshold, a first group of first colour component neighboring reference values L(m) and second colour component neighboring reference values C(m) are obtained.

If the first colour component neighboring reference values of the current coding block are greater than the at least one threshold, a second group of first colour component neighboring reference values L(k) and second colour component neighboring reference values C(k) are obtained.

In the above solutions, the establishment part 903 is specifically configured to perform the following operations.

A first parameter $\alpha1$ of a first computing model and a second parameter $\beta1$ of the first computing model are computed according to L(m), C(m) and the formula (4).

A first parameter $\alpha2$ of a second computing model and a second parameter $\beta2$ of the second computing model are computed according to L(k), C(k) and the formula (5).

The first computing model $Pred_{1C}[i, j]$ and the second computing model $Pred_{2C}[i, j]$ are established according to the first parameter $\alpha1$ of the first computing model and the second parameter $\beta1$ of the first computing model, the first parameter $\alpha2$ of the second computing model and the second parameter $\beta2$ of the second computing model as well as the formula (6).

Figure 11:
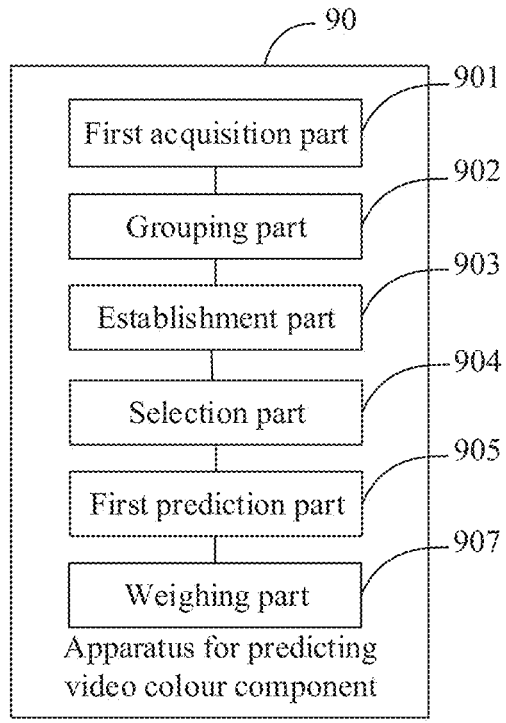
FIG. 11 is a compositional structural schematic diagram of still another apparatus for predicting a video colour component provided by embodiments of the application.

In the above solutions, referring to FIG. 11, the apparatus 90 for predicting the video colour component may further include a weighing part 907, which is configured to perform the following operations.

A weighting coefficient w(m) for L(m) and C(m) of the first computing model is computed according to L(m), $Rec_L[i, j]$ and the formula (7).

A weighting coefficient w(k) for L(k) and C(k) of the second computing model is computed according to L(k), $Rec_L[i, j]$ and the formula (8).

In the above solutions, the establishment part 903 is specifically configured to perform the following operations.

A first parameter $\alpha1$ of a first computing model and a second parameter $\beta1$ of the first computing model are computed according to w(m), L(m), C(m) and the formula (9).

A first parameter $\alpha2$ of a second computing model and a second parameter $\beta2$ of the second computing model are computed according to w(k), L(k), C(k) and the formula (10).

The first computing model $Pred_{1C}[i, j]$ and the second computing model $Pred_{2C}[i, j]$ are established according to the first parameter $\alpha1$ of the first computing model and the second parameter $\beta1$ of the first computing model, the first parameter $\alpha2$ of the second computing model and the second parameter $\beta2$ of the second computing model as well as the formula (11).

In the above solutions, the selection part 904 is specifically configured to perform the following operations.

Grouping is performed according to the comparison results between the first colour component reconstructed values of all samples of the current coding block and the at least one threshold to obtain at least two groups of first colour component reconstructed value sets, and a corresponding relationship between the at least two groups of first colour component reconstructed value sets and the at least two computing models.

The computing model corresponding to each sample in the current coding block is selected from the at least two computing models according to first colour component reconstructed value sets to which the first colour component reconstructed values of all samples in the current coding block belongs and the corresponding relationship between the at least two groups of first colour component reconstructed value sets and the at least two computing models.

Figure 12:
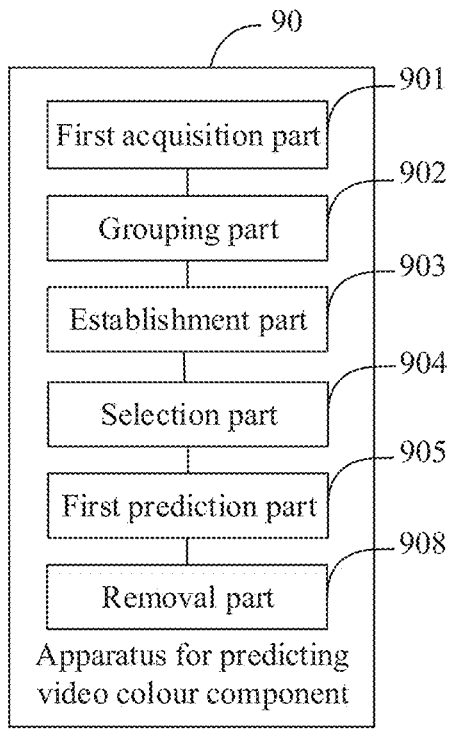
FIG. 12 is a compositional structural schematic diagram of still another apparatus for predicting a video colour component provided by embodiments of the application.

In the above solutions, referring to FIG. 12, the apparatus 90 for predicting the video colour component may further include a removal part 908, which is configured to perform the following operations.

The first colour component neighboring reference values of the current coding block are traversed, and difference computation is performed on any one sampling value in the first colour component neighboring reference values and the first colour component reconstructed values of all samples of the current coding block to obtain a difference set corresponding to the sampling value.

If a minimum value in the difference set is greater than a preset threshold, the sampling value is removed from the first colour component neighboring reference values and a sampling value of a corresponding position is removed from the second colour component neighboring reference values.

Figure 13:
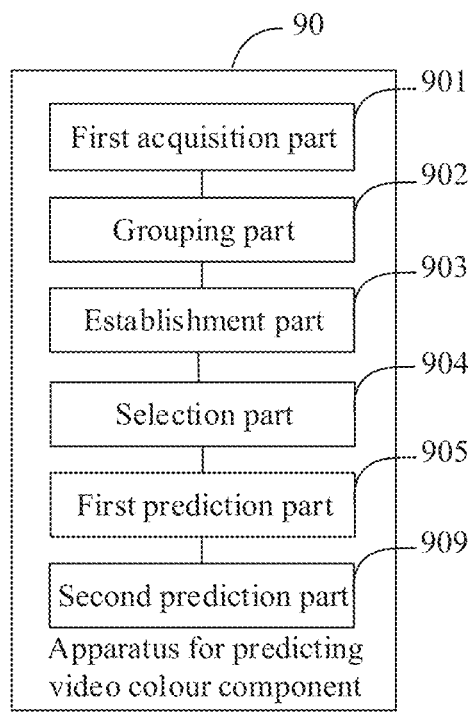
FIG. 13 is a compositional structural schematic diagram of still another apparatus for predicting a video colour component provided by embodiments of the application.

In the above solutions, referring to FIG. 13, the apparatus 90 for predicting the video colour component may further include a second prediction part 909, which is configured to perform the following operations.

A predicted residual $pred'_{Cb}[i, j]$ of a second colour component of a sample [i, j] in the current coding block and a third colour component estimated value $pred_{Cr}[i, j]$ of the sample[i, j] are acquired.

A third colour component predicted value of the sample[i, j] is computed according to $pred'_{Cb}[i, j]$, $pred_{Cr}[i, j]$ and the formula (12).

It may be understood that, in the embodiments, "part" may be part of a circuit, part of a processor, part of a program or software and the like, of course, may also be a unit and may further be modular and may also be non-modular.

In addition, each component in the embodiments may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solutions of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiments provide a computer storage medium, which stores programs for predicting a video colour component. The programs for predicting the video colour component are executed by at least one processor to implement the operations of the method of Embodiment 1.

Figure 14:
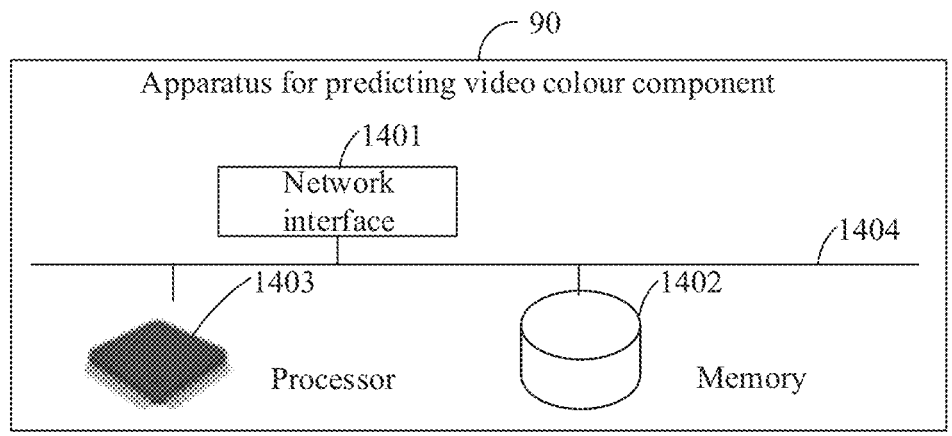
FIG. 14 is a specific hardware structural schematic diagram of an apparatus for predicting a video colour component provided by embodiments of the application.

Based on the composition of the apparatus 90 for predicting the video colour component and the computer storage medium, referring to FIG. 14, a specific hardware structure of the apparatus 90 for predicting the video colour component provided in the embodiments of the application is shown, and may include a network interface 1401, a memory 1402 and a processor 1403. Each component is coupled together through a bus system 1404. It may be understood that the bus system 1404 is configured to implement connection communication between these components. The bus system 1404 includes a data bus and further includes a power bus, a control bus and a state signal bus. However, for clear description, various buses in FIG. 14 are marked as the bus system 1404. The network interface 1401 is configured to receive and send a signal in a process of receiving and sending information with another external network element.

The memory 1402 is configured to store computer programs capable of running in the processor 1403.

The processor 1403 is configured to run the computer programs to execute the following operations.

At least one threshold is acquired according to first colour component reconstructed values of all samples of a current coding block.

Grouping is performed according to comparison results between first colour component neighboring reference values of the current coding block and the at least one threshold to obtain at least two groups of first colour component neighboring reference values and second colour component neighboring reference values.

At least two computing models are established according to the at least two groups of first colour component neighboring reference values and second colour component neighboring reference values.

A computing model corresponding to each sample in the current coding block is selected from the at least two computing models according to comparison results between the first colour component reconstructed values of all samples of the current coding block and the at least one threshold.

Second colour component predicted values of all samples in the current coding block are acquired according to the computing model corresponding to each sample in the current coding block.

It may be understood that the memory 1402 in the embodiment of the application may be a volatile memory or a nonvolatile memory, or may include both the volatile and nonvolatile memories. The nonvolatile memory may be an ROM, a Programmable ROM (PROM), an Erasable PROM (EPROM), an Electrically EPROM (EEPROM) or a flash memory. The volatile memory may be an RAM, and is used as an external high-speed buffer. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory 1402 of a system and method described in the disclosure is intended to include, but not limited to, memories of these and any other proper types.

The processor 1403 may be an integrated circuit chip, and has a signal processing capability. In an implementation process, each step of the method may be completed by an integrated logic circuit of hardware in the processor 1403 or an instruction in a software form. The processor 1403 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the memory 1402. The processor 1403 reads information in the memory 1402 and completes the operations of the method in combination with hardware.

It may be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the processor 1403 is further configured to run the computer program to execute the operations of the method for predicting the video colour component in Embodiment 1.

It is to be noted that the terms "include", "contain" or any other variations thereof are intended to cover a non-exclusive inclusion, such that a process, method, article or equipment including a series of elements not only includes those elements, but also includes those elements that are not explicitly listed, or includes elements inherent to such a process, method, article or device. Under the condition of no more limitations, it is not excluded that additional identical elements further exist in the process, method, article or device including elements defined by a sentence "including a . . . ".

The serial numbers of the embodiments of the application are merely for description and do not recurrent a preference of the embodiments.

By means of the above-mentioned descriptions on the implementation manners, the person skilled in the art may clearly understand that the methods in the embodiments may be implemented by software plus a necessary universal hardware platform, and may also be implemented by hardware certainly, but under most conditions, the former is a better implementation manner. Based on such an understanding, the technical solutions of the application substantially or parts making contributions to the conventional art may be embodied in form of software product, and the computer software product is stored in a storage medium (such as an ROM/RAM, a magnetic disk and an optical disc), including a plurality of instructions configured to enable a terminal (which may be a mobile phone, a computer, a server, an air conditioner, a network device or the like) to execute the method in each embodiment of the application.

The embodiments of the application are described above in combination with the accompanying drawings. However, the application is not limited to the above specific implementation manners. The above specific implementation manners are merely schematic rather than restrictive. Those of ordinary skill in the art may further make many forms without departing from a tenet of the application and a scope protected by the claims under the inspiration of the application, all of which pertain to the scope of protection of the application.

INDUSTRIAL APPLICABILITY

In the embodiments of the application, at least one threshold is acquired according to first colour component reconstructed values of all samples of a current coding block; grouping is performed according to comparison results between first colour component neighboring reference values of the current coding block and the at least one threshold to obtain at least two groups of first colour component neighboring reference values and second colour component neighboring reference values; at least two computing models are established according to the at least two groups of first colour component neighboring reference values and second colour component neighboring reference values; a computing model corresponding to each sample in the current coding block is selected from the at least two computing models according to comparison results between the first colour component reconstructed values of all samples of the current coding block and the at least one threshold; and second colour component predicted values of all samples in the current coding block is acquired according to the computing model corresponding to each sample in the current coding block. Therefore, the prediction accuracy of the video colour component may be improved, and thus the coding rate is saved.

The invention claimed is:

1. A method for predicting a video colour component, applicable to an encoder, comprising:
determining at least two groups including a first group and a second group, wherein each of the first and second groups comprises first colour component neighboring reference values and second colour component neighboring reference values of a current coding block;
determining weighting coefficients for the first and second groups;
establishing at least two computing models according to the at least two groups of first colour component neighboring reference values and second colour component neighboring reference values, wherein each of the at least two groups has one model of the at least two computing models, wherein the at least two computing models are in the same intra prediction model with different model parameters, and wherein the different model parameters are determined based on the weighting coefficients of the first and second groups, respectively;
selecting a computing model corresponding to the current coding block from the at least two computing models;
acquiring, according to the computing model corresponding to the current coding block, a second colour component predicted value of at least one sample in the current coding block; and
encoding the second predicted value to obtain a bitstream in the encoder,
wherein establishing the at least two computing models according to the at least two groups of first colour component neighboring reference values and second colour component neighboring reference values comprises:
in response to the first group of first colour component neighboring reference values being L(m), the first group of second colour component neighboring reference values being C(m), and the weighting coefficient for the first group of first colour component neighboring reference values and second colour component neighboring reference values being w(m), computing the first parameter α1 and the second parameter β1 of the first computing model according to w(m), L(m), C(m) and an equation (1):

$$\begin{cases} \alpha 1 = \dfrac{\sum w(m) \cdot \sum (w(m) \cdot L(m) \cdot C(m)) - \sum (w(m) \cdot L(m)) \cdot \sum (w(m) \cdot C(m))}{\sum w(m) \cdot \sum (w(m) \cdot L(m) \cdot L(m)) - \sum (w(m) \cdot L(m)) \cdot \sum (w(m) \cdot L(m))} \\ \beta 1 = \dfrac{\sum (w(m) \cdot C(m)) - \alpha 1 \cdot \sum (w(m) \cdot L(m))}{\sum w(m)} \end{cases} \quad (1)$$

and
in response to the second group of first colour component neighboring reference values being L(k), the second group of second colour component neighboring reference values being C(k), and the weighting coefficient for the second group of first colour component neighboring reference values and second colour component neighboring reference values being w(k), computing the first parameter α2 and the second parameter β2 of the second computing model according to w(k), L(k), C(k) and an equation (2):

$$\begin{cases} \alpha 2 = \dfrac{\sum w(k) \cdot \sum (w(k) \cdot L(k) \cdot C(k)) - \sum (w(k) \cdot L(k)) \cdot \sum (w(k) \cdot C(k))}{\sum w(k) \cdot \sum (w(k) \cdot L(k) \cdot L(k)) - \sum (w(k) \cdot L(k)) \cdot \sum (w(k) \cdot L(k))} \\ \beta 2 = \dfrac{\sum (w(k) \cdot L(k)) - \alpha 2 \cdot \sum (w(k) \cdot L(k))}{\sum w(k)} \end{cases} \quad (2)$$

2. The method of claim 1, before determining the at least two groups of first colour component neighboring reference values and second colour component neighboring reference values of the current coding block, further comprising:
sampling neighboring reference values of a first colour component for the current coding block to acquire the first colour component neighboring reference values of the current coding block; and sampling neighboring reference values of a second colour component for the current coding block to acquire the second colour component neighboring reference values of the current coding block.

3. The method of claim 2, wherein the operations of sampling at least comprises down-sampling.

4. The method of claim 2, determining the at least two groups of first colour component neighboring reference values and second colour component neighboring reference values of the current coding block comprises:

acquiring a first group of first colour component neighboring reference values and second colour component neighboring reference values from the first colour component neighboring reference values of the current coding block and the second colour component neighboring reference values of the current coding block; and acquiring a second group of first colour component neighboring reference values and second colour component neighboring reference values from the first colour component neighboring reference values of the current coding block and the second colour component neighboring reference values of the current coding block.

5. The method of claim 4, wherein establishing the at least two computing models according to the at least two groups of first colour component neighboring reference values and second colour component neighboring reference values comprises:

computing a first parameter and a second parameter of a first computing model according to the first group of first colour component neighboring reference values and second colour component neighboring reference values;

computing a first parameter and a second parameter of a second computing model according to the second group of first colour component neighboring reference values and second colour component neighboring reference values; and determining the first computing model according to the first parameter and the second parameter of the first computing model and determining the second computing model according to the first parameter and the second parameter of the second computing model.

6. The method of claim 2, wherein the first colour component neighboring reference values of the current coding block comprises at least one of the following: first colour component neighboring reference values at left side of the current coding block or first colour component neighboring reference values at upper side of the current coding block, and the second colour component neighboring reference values of the current coding block comprises at least one of the following: second colour component neighboring reference values at left side of the current coding block or second colour component neighboring reference values at upper side of the current coding block.

7. The method of claim 6, wherein determining the at least two groups of first colour component neighboring reference values and second colour component neighboring reference values of the current coding block comprises at least two of the following:

determining, from the first colour component neighboring reference values of the current coding block and the second colour component neighboring reference values of the current coding block, the first colour component neighboring reference values at left side of the current coding block and the second colour component neighboring reference values at left side of the current coding block to be a first group of first colour component neighboring reference values and second colour component neighboring reference values;

determining, from the first colour component neighboring reference values of the current coding block and the second colour component neighboring reference values of the current coding block, the first colour component neighboring reference values at upper side of the current coding block and the second colour component neighboring reference values at upper side of the current coding block to be a second group of first colour component neighboring reference values and second colour component neighboring reference values; and determining, from the first colour component neighboring reference values of the current coding block and the second colour component neighboring reference values of the current coding block, first colour component neighboring reference values at left side and upper side of the current coding block and second colour component neighboring reference values at left side and upper side of the current coding block to be a third group of first colour component neighboring reference values and second colour component neighboring reference values.

8. The method of claim 7, wherein before establishing the at least two computing models, the method further comprises at least two of the following:

computing a first parameter and a second parameter of a first computing model according to the first group of first colour component neighboring reference values and second colour component neighboring reference values;

computing a first parameter and a second parameter of a second computing model according to the second group of first colour component neighboring reference values and second colour component neighboring reference values; and computing a first parameter and a second parameter of a third computing model according to the third group of first colour component neighboring reference values and second colour component neighboring reference values; and wherein establishing the at least two computing models comprises:

establishing at least one of the first computing model, the second computing mode or the third computing mode according to at least one of the first parameter and the second parameter of the first computing model, the first parameter and the second parameter of the second computing model, or the first parameter and the second parameter of the third computing model.

9. The method of claim 1, wherein selecting the computing model corresponding to the current coding block from the at least two computing models comprises:

computing, according to a first colour component reconstructed value of at least one sample in the current coding block and the at least two computing models, each of rate-distortion cost values, corresponding to a respective one of the at least two computing models, of the current coding block; and selecting, according to the computed at least two rate-distortion cost values, the computing model corresponding to the current coding block.

10. The method of claim 1, before establishing the at least two computing models according to the at least two groups of first colour component neighboring reference values and second colour component neighboring reference values, further comprising:
    traversing the first colour component neighboring reference values of the current coding block, and screening the traversed first colour component neighboring reference values.

11. The method of claim 10, wherein screening the traversed first colour component neighboring reference values comprises:
    selecting first colour component sampling values of to-be-removed pixels from the traversed first colour component neighboring reference values;
    removing the selected first colour component sampling values from the first colour component neighboring reference values; and
    removing second colour component sampling values of the to-be-removed pixels from the second colour component neighboring reference values, or
    wherein screening the traversed first colour component neighboring reference values comprises:
    selecting first colour component sampling values of to-be-removed pixels from the traversed first colour component neighboring reference values;
    setting, in the first colour component neighboring reference values, a weighting coefficient for the selected first colour component sampling values equal to 0; and
    setting, in the second colour component neighboring reference values, a weighting coefficient for second colour component sampling values of the to-be-removed pixels equal to 0.

12. A method for predicting a video colour component, applicable to a decoder, comprising:
    decoding a bitstream;
    determining at least two groups including a first group and a second group, wherein each of the first and second groups comprises first colour component neighboring reference values and second colour component neighboring reference values of a current coding block;
    determining weighting coefficients for the first and second groups;
    establishing at least two computing models according to the at least two groups of first colour component neighboring reference values and second colour component neighboring reference values wherein each of the at least two groups has one model of the at least two computing models, wherein the at least two computing models are in the same intra prediction model with different model parameters, and wherein the different model parameters are determined based on the weighting coefficients of the first and second groups, respectively;
    determining a computing model corresponding to the current coding block from the at least two computing models according to the bitstream;
    acquiring, according to the computing model corresponding to the current coding block, a second colour component predicted value of at least one sample in the current coding block; and
    encoding the second predicted value to obtain a bitstream in the encoder,
    wherein establishing the at least two computing models according to the at least two groups of first colour component neighboring reference values and second colour component neighboring reference values comprises:
    in response to the first group of first colour component neighboring reference values being L(m), the first group of second colour component neighboring reference values being C(m), and the weighting coefficient for the first group of first colour component neighboring reference values and second colour component neighboring reference values being w(m), computing the first parameter $\alpha 1$ and the second parameter $\beta 1$ of the first computing model according to w(m), L(m), C(m) and an equation (1):

$$\begin{cases} \alpha 1 = \dfrac{\sum w(m) \cdot \sum (w(m) \cdot L(m) \cdot C(m)) - \sum (w(m) \cdot L(m)) \cdot \sum (w(m) \cdot C(m))}{\sum w(m) \cdot \sum (w(m) \cdot L(m) \cdot L(m)) - \sum (w(m) \cdot L(m)) \cdot \sum (w(m) \cdot L(m))} \\ \beta 1 = \dfrac{\sum (w(m) \cdot C(m)) - \alpha 1 \cdot \sum (w(m) \cdot L(m))}{\sum w(m)} \end{cases} \quad (1)$$

and
in response to the second group of first colour component neighboring reference values being L(k), the second group of second colour component neighboring reference values being C(k), and the weighting coefficient for the second group of first colour component neighboring reference values and second colour component neighboring reference values being w(k), computing the first parameter $\alpha 2$ and the second parameter $\beta 2$ of the second computing model according to w(k), L(k), C(k) and an equation (2):

$$\begin{cases} \alpha 2 = \dfrac{\sum w(k) \cdot \sum (w(k) \cdot L(k) \cdot C(k)) - \sum (w(k) \cdot L(k)) \cdot \sum (w(k) \cdot C(k))}{\sum w(k) \cdot \sum (w(k) \cdot L(k) \cdot L(k)) - \sum (w(k) \cdot L(k)) \cdot \sum (w(k) \cdot L(k))} \\ \beta 2 = \dfrac{\sum (w(k) \cdot C(k)) - \alpha 2 \cdot \sum (w(k) \cdot L(k))}{\sum w(k)} \end{cases} \quad (2)$$

13. The method of claim 12, before establishing the at least two computing models according to the at least two groups of first colour component neighboring reference values and second colour component neighboring reference values, further comprising:
    determining a weighting coefficient for a first group of first colour component neighboring reference values and second colour component neighboring reference values; and
    determining a weighting coefficient for a second group of first colour component neighboring reference values and second colour component neighboring reference values.

14. The method of claim 12, before establishing the at least two computing models according to the at least two groups of first colour component neighboring reference values and second colour component neighboring reference values, further comprising:
    traversing the first colour component neighboring reference values of the current coding block, and screening the traversed first colour component neighboring reference values, wherein screening the traversed first colour component neighboring reference values comprises:
selecting first colour component sampling values of to-be-removed pixels from the traversed first colour component neighboring reference values;
removing the selected first colour component sampling values from the first colour component neighboring reference values; and
removing second colour component sampling values of the to-be-removed pixels from the second colour component neighboring reference values.

15. A device for predicting a video colour component, applicable to an encoder, comprising: a network interface, a memory, and a processor, wherein
the network interface is configured to receive and send signals in a process of receiving and sending information with other external network elements;
the memory is configured to store computer programs capable of running in the processor; and
when the computer programs are run by the processor, the processor is configured to:
determine at least two groups including a first group and a second group, wherein each of the first and second groups comprises first colour component neighboring reference values and second colour component neighboring reference values of a current coding block;
establish at least two computing models according to the at least two groups of first colour component neighboring reference values and second colour component neighboring reference values, wherein each of the at least two groups has one model of the at least two computing models, wherein the at least two computing models are in the same intra prediction model with different model parameters, and wherein the different model parameters are determined based on the weighting coefficients of the first and second groups, respectively;
select a computing model corresponding to the current coding block from the at least two computing models;
acquire, according to the computing model corresponding to the current coding block, a second colour component predicted value of at least one sample in the current coding block; and
encode the second predicted value to obtain a bitstream in the encoder, wherein the processor is specifically configured to:
in response to the first group of first colour component neighboring reference values being L(m), the first group of second colour component neighboring reference values being C(m), and the weighting coefficient for the first group of first colour component neighboring reference values and second colour component neighboring reference values being w(m), computing the first parameter α1 and the second parameter β1 of the first computing model according to w(m), L(m), C(m) and an equation (1):

$$\alpha 1 = \frac{\sum w(m) \cdot \sum (w(m) \cdot L(m) \cdot C(m)) - \sum (w(m) \cdot L(m)) \cdot \sum (w(m) \cdot C(m))}{\sum w(m) \cdot \sum (w(m) \cdot L(m) \cdot L(m)) - \sum (w(m) \cdot L(m)) \cdot \sum (w(m) \cdot L(m))} \quad (1)$$

$$\beta 1 = \frac{\sum (w(m) \cdot C(m)) - \alpha 1 \cdot \sum (w(m) \cdot L(m))}{\sum w(m)};$$

and
in response to the second group of first colour component neighboring reference values being L(k), the second group of second colour component neighboring reference values being C(k), and the weighting coefficient for the second group of first colour component neighboring reference values and second colour component neighboring reference values being w(k), computing the first parameter α2 and the second parameter β2 of the second computing model according to w(k), L(k), C(k) and an equation (2):

$$\alpha 2 = \frac{\sum w(k) \cdot \sum (w(k) \cdot L(k) \cdot C(k)) - \sum (w(k) \cdot L(k)) \cdot \sum (w(k) \cdot C(k))}{\sum w(k) \cdot \sum (w(k) \cdot L(k) \cdot L(k)) - \sum (w(k) \cdot L(k)) \cdot \sum (w(k) \cdot L(k))} \quad (2)$$

$$\beta 2 = \frac{\sum (w(k) \cdot C(k)) - \alpha 2 \cdot \sum (w(k) \cdot L(k))}{\sum w(k)}.$$

16. The device of claim 15, wherein the processor is further configured to:
sample neighboring reference values of a first colour component for the current coding block to acquire the first colour component neighboring reference values of the current coding block; and
sample neighboring reference values of a second colour component for the current coding block to acquire the second colour component neighboring reference values of the current coding block.

17. The device of claim 16, wherein the operations of sampling at least comprises down-sampling.

18. The device of claim 16, wherein the processor is specifically configured to:
acquire a first group of first colour component neighboring reference values and second colour component neighboring reference values from the first colour component neighboring reference values of the current coding block and the second colour component neighboring reference values of the current coding block; and
acquire a second group of first colour component neighboring reference values and second colour component neighboring reference values from the first colour component neighboring reference values of the current coding block and the second colour component neighboring reference values of the current coding block.

19. The device of claim 18, wherein the processor is further configured to:
compute a first parameter and a second parameter of a first computing model according to the first group of first colour component neighboring reference values and second colour component neighboring reference values;
compute a first parameter and a second parameter of a second computing model according to the second group of first colour component neighboring reference values and second colour component neighboring reference values; and determine the first computing model according to the first parameter and the second parameter of the first computing model and determining the second computing model according to the first parameter and the second parameter of the second computing model.

20. The device of claim 16, wherein the first colour component neighboring reference values of the current coding block comprises at least one of the following: first colour component neighboring reference values at left side of the current coding block or first colour component neighboring reference values at upper side of the current coding block, and the second colour component neighboring reference values of the current coding block comprises at least one of the following: second colour component neighboring reference values at left side of the current coding block or second colour component neighboring reference values at upper side of the current coding block.

21. The method of claim 20, wherein the processor is specifically configured to perform at least two operations of the following:

determining, from the first colour component neighboring reference values of the current coding block and the second colour component neighboring reference values of the current coding block, the first colour component neighboring reference values at left side of the current coding block and the second colour component neighboring reference values at left side of the current coding block to be a first group of first colour component neighboring reference values and second colour component neighboring reference values;

determining, from the first colour component neighboring reference values of the current coding block and the second colour component neighboring reference values of the current coding block, the first colour component neighboring reference values at upper side of the current coding block and the second colour component neighboring reference values at upper side of the current coding block to be a second group of first colour component neighboring reference values and second colour component neighboring reference values; and determining, from the first colour component neighboring reference values of the current coding block and the second colour component neighboring reference values of the current coding block, first colour component neighboring reference values at left side and upper side of the current coding block and second colour component neighboring reference values at left side and upper side of the current coding block to be a third group of first colour component neighboring reference values and second colour component neighboring reference values.

22. The device of claim 21, wherein the processor is further configured to perform at least two operations of the following:

computing a first parameter and a second parameter of a first computing model according to the first group of first colour component neighboring reference values and second colour component neighboring reference values;

computing a first parameter and a second parameter of a second computing model according to the second group of first colour component neighboring reference values and second colour component neighboring reference values; and computing a first parameter and a second parameter of a third computing model according to the third group of first colour component neighboring reference values and second colour component neighboring reference values; and wherein the processor is specifically configured to:

establish at least one of the first computing model, the second computing mode or the third computing mode according to at least one of the first parameter and the second parameter of the first computing model, the first parameter and the second parameter of the second computing model, or the first parameter and the second parameter of the third computing model.

23. The device of claim 15, wherein the processor is specifically configured to:

compute, according to a first colour component reconstructed value of at least one sample in the current coding block and the at least two computing models, each of rate-distortion cost values, corresponding to a respective one of the at least two computing models, of the current coding block; and select, according to the computed at least two rate-distortion cost values, the computing model corresponding to the current coding block.

24. The device of claim 15, wherein the processor is further configured to:

traverse the first colour component neighboring reference values of the current coding block, and screening the traversed first colour component neighboring reference values.

25. The device of claim 24, wherein the processor is specifically configured to:

select first colour component sampling values of to-be-removed pixels from the traversed first colour component neighboring reference values;

remove the selected first colour component sampling values from the first colour component neighboring reference values; and remove second colour component sampling values of the to-be-removed pixels from the second colour component neighboring reference values, or wherein the processor is specifically configured to:

select first colour component sampling values of to-be-removed pixels from the traversed first colour component neighboring reference values;

set, in the first colour component neighboring reference values, a weighting coefficient for the selected first colour component sampling values to be equal to 0; and set, in the second colour component neighboring reference values, a weighting coefficient for second colour component sampling values of the to-be-removed pixels to be equal to 0.

26. A device for predicting a video colour component, applicable to a decoder, comprising: a network interface, a memory, and a processor, wherein the network interface is configured to receive and send signals in a process of receiving and sending information with other external network elements;

the memory is configured to store computer programs capable of running in the processor; and when the computer programs are run by the processor, the processor is configured to:

decode a bitstream;

determine at least two groups including a first group and a second group, wherein each of the first and second groups comprises of first colour component neighboring reference values and second colour component neighboring reference values of a current coding block;

establish at least two computing models according to the at least two groups of first colour component neighboring reference values and second colour component neighboring reference values, wherein each of the at least two groups has one model of the at least two computing models, wherein the at least two computing models are in the same intra prediction model with different model parameters, and wherein the different model parameters are determined based on the weighting coefficients of the first and second groups, respectively;

determine a computing model corresponding to the current coding block from the at least two computing models according to the bitstream;

acquire, according to the computing model corresponding to the current coding block, a second colour component predicted value of at least one sample in the current coding block; and encode the second predicted value to obtain a bitstream in the encoder, wherein the processor is specifically configured to:

in response to the first group of first colour component neighboring reference values being L(m), the first group of second colour component neighboring reference values being C(m), and the weighting coefficient for the first group of first colour component neighboring reference values and second colour component neighboring reference values being w(m), computing the first parameter α1 and the second parameter β1 of the first computing model according to w(m), L(m), C(m) and an equation (1):

$$\alpha 1 = \frac{\sum w(m) \cdot \sum (w(m) \cdot L(m) \cdot C(m)) - \sum (w(m) \cdot L(m)) \cdot \sum (w(m) \cdot C(m))}{\sum w(m) \cdot \sum (w(m) \cdot L(m) \cdot L(m)) - \sum (w(m) \cdot L(m)) \cdot \sum (w(m) \cdot L(m))} \quad (1)$$

$$\beta 1 = \frac{\sum (w(m) \cdot C(m)) - \alpha 1 \cdot \sum (w(m) \cdot L(m))}{\sum w(m)};$$

and in response to the second group of first colour component neighboring reference values being L(k), the second group of second colour component neighboring reference values being C(k), and the weighting coefficient for the second group of first colour component neighboring reference values and second colour component neighboring reference values being w(k), computing the first parameter α2 and the second parameter β2 of the second computing model according to w(k), L(k), C(k) and an equation (2):

$$\alpha 2 = \frac{\sum w(k) \cdot \sum (w(k) \cdot L(k) \cdot C(k)) - \sum (w(k) \cdot L(k)) \cdot \sum (w(k) \cdot C(k))}{\sum w(k) \cdot \sum (w(k) \cdot L(k) \cdot L(k)) - \sum (w(k) \cdot L(k)) \cdot \sum (w(k) \cdot L(k))} \quad (2)$$

$$\beta 2 = \frac{\sum (w(k) \cdot C(k)) - \alpha 2 \cdot \sum (w(k) \cdot L(k))}{\sum w(k)}.$$

\* \* \* \* \*